(12) United States Patent
Deputat et al.

(10) Patent No.: US 8,555,333 B2
(45) Date of Patent: Oct. 8, 2013

(54) IDENTIFYING AND RESOLVING SEPARATION OF DUTIES CONFLICTS IN A MULTI-APPLICATION ENVIRONMENT

(75) Inventors: Jurij M. Deputat, Longmont, CO (US); Steven J. Ponessa, Montgomery, NY (US)

(73) Assignee: International Business Machines Corporation, Armonk, NY (US)

(*) Notice: Subject to any disclaimer, the term of this patent is extended or adjusted under 35 U.S.C. 154(b) by 1361 days.

(21) Appl. No.: 12/193,141

(22) Filed: Aug. 18, 2008

(65) Prior Publication Data

US 2010/0043051 A1  Feb. 18, 2010

(51) Int. Cl.
*H04L 29/06* (2006.01)

(52) U.S. Cl.
USPC ........... 726/1; 726/2; 726/26; 726/27; 726/28

(58) Field of Classification Search
USPC .............................................. 726/1, 2, 26–28
See application file for complete search history.

(56) References Cited

U.S. PATENT DOCUMENTS

| | | | |
|---|---|---|---|
| 5,534,855 A * | 7/1996 | Shockley et al. | 340/5.52 |
| 7,140,035 B1 | 11/2006 | Karch | |
| 7,340,469 B1 * | 3/2008 | Alghathbar et al. | 1/1 |
| 2002/0120482 A1 * | 8/2002 | Anderson et al. | 705/7 |
| 2003/0204751 A1 | 10/2003 | Jindani et al. | |
| 2005/0229001 A1 | 10/2005 | Brown et al. | |
| 2006/0143231 A1 * | 6/2006 | Boccasam et al. | 707/104.1 |
| 2006/0248599 A1 | 11/2006 | Sack et al. | |
| 2007/0169168 A1 | 7/2007 | Lim | |
| 2008/0098485 A1 * | 4/2008 | Chiou | 726/27 |
| 2008/0163347 A1 * | 7/2008 | Ratcliff et al. | 726/6 |
| 2008/0184336 A1 * | 7/2008 | Sarukkai et al. | 726/1 |
| 2008/0229413 A1 * | 9/2008 | Arroyo et al. | 726/21 |
| 2009/0205016 A1 * | 8/2009 | Milas | 726/1 |

OTHER PUBLICATIONS

Kugblenu et al., Separation of Duty in Role Based Access Control System: A Case Study, Jan. 2007, Retrieved from http://www.bth.se/fou/cuppsats.nsf/all/52d12689b4758c84c12572a600386f1d/$file/MCS-2006-16.pdf, pp. 1-47.*

Hu et al., Assessment of Access Control Systems, Sep. 2006, Retrieved from http://csrc.nist.gov/publications/nistir/7316/NISTIR-7316.pdf, pp. 1-60.*

(Continued)

*Primary Examiner* — Carl Colin
*Assistant Examiner* — Chau Le
(74) *Attorney, Agent, or Firm* — Schmeiser, Olsen & Watts; Arthur J. Samodovitz

(57) ABSTRACT

A method and system for identifying and resolving separation of duties (SOD) conflicts in a multi-application environment. An SOD conflict based on a person being granted a first authorization and a second authorization in violation of a policy is identified. The first and second authorizations are permissions allowing the person to perform, respectively, a first action provided by a first application and a second action provided by a second application. An optimal recommended action that resolves the SOD conflict is retrieved from a first database table that includes an association between the identified SOD conflict and the optimal recommended action. After the optimal recommended action is displayed on a display device, a user's acceptance of the optimal recommended action is received. In response, the optimal recommended action is performed by automatically deleting from a second database table an association between the person and the first or second authorization.

19 Claims, 8 Drawing Sheets

(56) References Cited

OTHER PUBLICATIONS

Ravi Sandhu; Separation of Duties in Computerized Information Systems; Proc. of the IFIP WG11.3 Workshop on Database Security, Halifax, U.K., Sep. 18-21, 1990; 10 pages.

Takabi et al.; Separation of Duty in Role-Based Access Control Model through Fuzzy Relations; Third International Symposium on Information Assurance and Security; 2007 IEEE Computer Society; pp. 125-130.

* cited by examiner

IDENTIFYING AND RESOLVING SEPARATION OF DUTIES CONFLICTS IN A MULTI-APPLICATION ENVIRONMENT

FIELD OF THE INVENTION

The present invention relates to a data processing technique for identifying and resolving separation of duties conflicts in a multi-application environment and more particularly to a technique for automatically determining and presenting optimal resolutions to separation of duties conflicts that are identified across applications.

BACKGROUND OF THE INVENTION

In large corporations that rely on several different applications to run their day-to-day operations, it is difficult to keep track of and review all application authorizations. More importantly, it is difficult to understand how those authorizations interact with each other to determine if there is a separation of duties conflict pertaining to any one employee. As the number and complexity of the applications increases, it becomes more problematical to identify and resolve these conflicts. Not being able to easily identify and resolve these conflicts may allow a user to be granted all the necessary components to maliciously damage the business. Not having efficient control and understanding of all authorizations and how the authorizations interact from a separation of duties perspective also puts the business in legal jeopardy. Thus, there exists a need to overcome at least one of the preceding deficiencies and limitations of the related art.

SUMMARY OF THE INVENTION

The present invention provides a computer-implemented method of identifying and resolving separation of duties (SOD) conflicts in a multi-application computing environment. An SOD conflict is identified. The identified SOD conflict is based on a person being granted a first authorization and a second authorization in violation of a policy that prohibits any one person from being granted both the first authorization and the second authorization. The first authorization is a permission that is granted to the person and that allows the person to perform a first action provided by a first application. The second authorization is a permission that is granted to the person and that allows the person to perform a second action provided by a second application. The first application and second application are different applications in the multi-application computing environment. Responsive to identifying the SOD conflict, an optimal recommended action resolving the SOD conflict is retrieved from a first database table based on the first database table associating the SOD conflict with the optimal recommended action. After retrieving the optimal recommended action, display of the optimal recommended action on a display device is initiated. After initiating display of the optimal recommended action, an acceptance of the optimal recommended action is received from a computing unit utilized by an end user. In response to receiving the acceptance, the optimal recommended action is automatically performed to resolve the SOD conflict by deleting a first association or a second association in a second database table. The first association is an association between the first authorization and the person. The second association is an association between the second authorization and the person. The second database table includes authorizations including the second authorization. The authorizations in the second database table include permission(s) granted to the person that allow the person to perform action(s) provided by application(s) that include the second application. The application(s) are included in the multi-application computing environment. A system and computer program product corresponding to the above-summarized method are also described and claimed herein.

DETAILED DESCRIPTION OF THE INVENTION

Overview

Embodiments of the present invention identify any authorizations (a.k.a. authorities or entitlements) previously granted or currently requested by a person that cause a violation of a cross-application separation of duties (SOD) policy (i.e., identifies an SOD conflict). These embodiments also intelligently determine and present a recommended action to resolve the identified SOD conflict. An example of an SOD conflict is a result of granting one person a first authority to submit billable hours for approval and granting the same person a second authority to approve his or her billable hour requests. The implementation of the present invention may begin with one or more users defining SOD conflicts by describing various attributes of authorizations that violate SOD policy across multiple applications. In response to receiving a new request for an authorization, one embodiment of the present invention (1) determines the attributes of the new request, (2) determines if the new request violates an SOD based on previously defined cross-application SOD conflicts, and (3) presents one or more recommended actions to resolve any identified SOD conflict. Another embodiment of the present invention (1) reviews existing authorizations, (2) identifies any SOD conflicts by determining whether any of the existing authorizations violate the SOD policy based on previously defined cross-application SOD conflicts, and (3) presents one or more recommended actions to resolve each identified SOD conflict. Furthermore, other embodiments of the present invention include ad hoc analyses and system-wide analyses using scheduled jobs that identify SOD conflicts across applications and recommend actions to resolve the identified SOD conflicts.

As used herein, an authorization is defined as a permission that is granted to a user and that allows the user to perform an action provided by an application.

System for Identifying and Resolving SOD Conflicts

Figure 1:
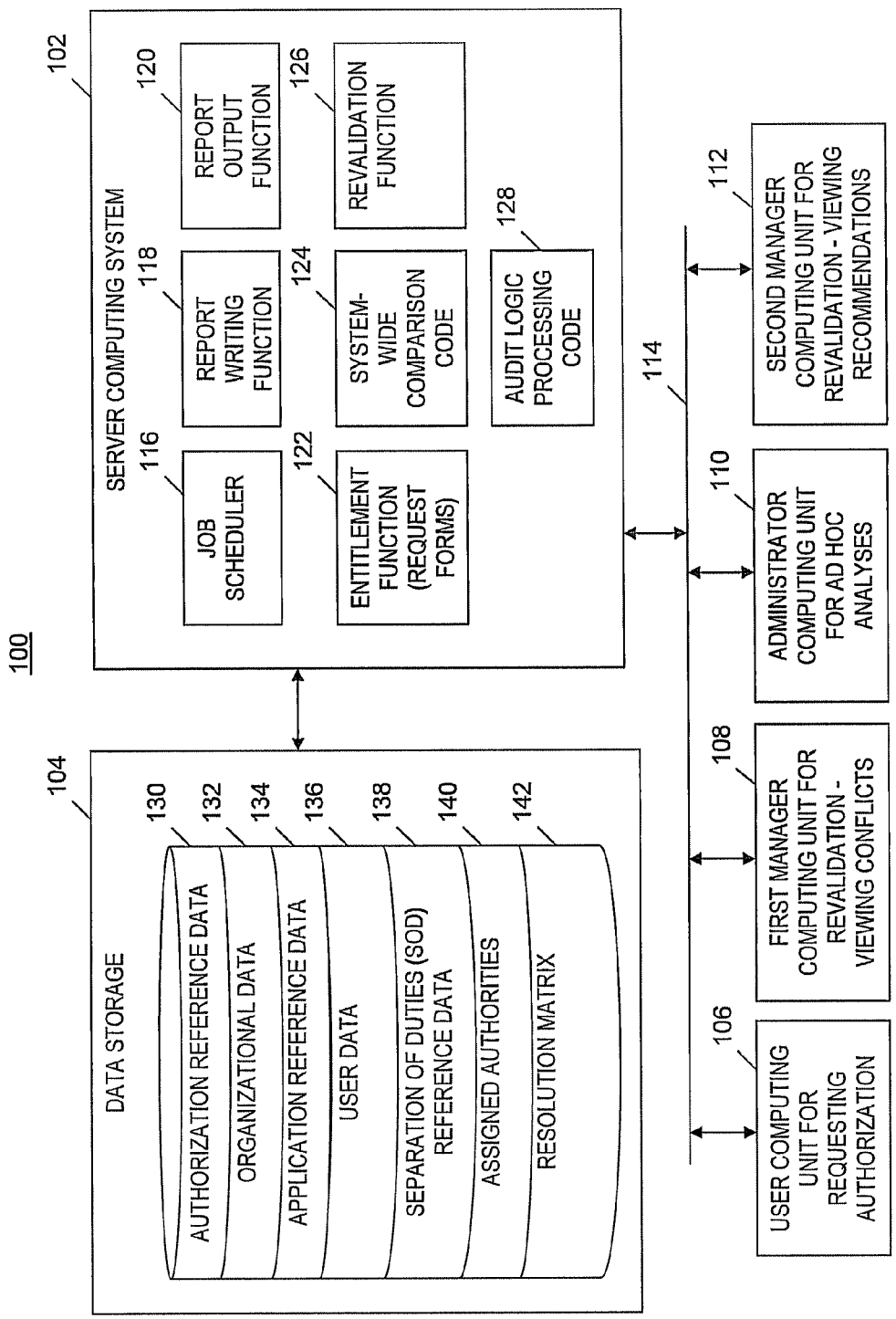
FIG. 1 is a block diagram of a system for identifying and resolving separation of duties conflicts in a multi-application computing environment, in accordance with embodiments of the present invention.

FIG. 1 is a block diagram of a system 100 for identifying and resolving separation of duties conflicts in a multi-application computing environment, in accordance with embodiments of the present invention. System 100 may include a server computing system 102, one or more data storage devices 104 (a.k.a. data storage), and one or more computing units that send requests to and receive SOD conflicts from server computing system 102. The one or more computing units may include a user computing unit 106, a first manager computing unit 108, an administrator computing unit 110, and/or a second manager computing unit 112.

Server computing unit 102 communicates with computing units 106, 108, 110 and 112 via a network 114 (e.g., the Internet). Server computing unit 102 may receive one or more requests for SOD authorizations from user computing unit 106 via network 114. Server computing unit 102 may receive one or more SOD revalidation requests from first manager computing unit 108 and/or second manager computing unit 112. Server computing unit 102 may receive one or more requests for ad hoc SOD conflicts analyses from administrator computing unit 110. In other embodiments, a request for the aforementioned authorization, revalidation, or an ad hoc analysis is received by computing system 102 from one of the other computing units shown in FIG. 1 or from a computing unit that is not shown in FIG. 1.

Server computing unit 102 may send a report that identifies one or more SOD conflicts for display at computing unit 108 and a report that identifies one or more recommended actions (a.k.a. SOD recommended actions) to resolve SOD conflicts for display at computing unit 112. In one embodiment, computing unit 108 is different from computing unit 112 and a first manager that views the report identifying SOD conflict(s) at computing unit 108 is different from a second manager that views the SOD recommended action(s) at computing unit 112. In another embodiment, computing units 108 and 112 are the same computing unit and/or the first manager who views the SOD conflict(s) report and the second manager who views the SOD recommendation(s) report are the same person.

Server computing system 102 may include one or more of the following software components: a job scheduler 116, a report writing function 118, a report output function 120, an entitlement function 122 for request forms, system-wide comparison code 124, and a revalidation function 126. Server computing system 102 also includes audit logic processing code 128. The features provided by the aforementioned software components of server computing system 102 are described below relative to FIGS. 2, 3, 4, 5A-5B, and 6. In a first embodiment (see FIG. 2), server computing system 102 includes entitlement function 122 and audit logic processing code 128, and the other components shown in computing system 102 are optional. In a second embodiment (see FIG. 3), server computing system 102 includes revalidation function 126 and audit logic processing code 128, and the other components shown in computing system 102 are optional. In a third embodiment (see FIG. 4), server computing system 102 includes report writing function 118, report output function 120 and audit logic processing code 128, and the other components shown in computing system 102 are optional. In a fourth embodiment (see FIGS. 5A-5B or FIG. 6), server computing system 102 includes job scheduler 116 and system-wide comparison code 124, and the other components shown in computing system 102 are optional. Other embodiments may include any combination of the aforementioned first, second, third and fourth embodiments.

In one embodiment, data storage 104 includes one or more databases that following database tables: an authorization reference data table 130, an organizational data table 132, an application reference data table 134, a user data table 136, an SOD reference data table 138, an assigned authorities table 140, and a resolution matrix 142. In another embodiment, data storage 104 includes authorization reference data table 130, user data table 136, SOD reference data table 132, assigned authorities table 140 and resolution matrix 142.

User data table 136 includes user (e.g., employee) information such as user identifiers. Authorization reference data table 130 includes attributes that specify authorizations and applications associated with the authorizations in a one-to-one correspondence. The authorizations specified in authorization reference data table 130 can be requested to be granted to a user who is identified in user data table 136 and who is a user of the corresponding application. If a user is granted an authorization, then the user "owns" that authorization. The applications included in data table 130 are all the applications in the multi-application computing environment. Thus, authorization reference data table 130 is a master table that includes attributes of authorizations for all applications of the multi-application computing environment.

Assigned authorities table 140 associates, in a one-to-many correspondence, users identified in user data table 136 with authorizations included in authorization reference table 130. Thus, assigned authorities table 140 specifies assignments to users of authorizations related to all applications in the multi-application computing environment. In one embodiment, assigned authorities table 140 associates serial numbers with identifiers, where the serial numbers identify authorizations and the identifiers identify the users to whom the authorizations are granted.

SOD reference data table 138 specifies SOD conflicts and associates the SOD conflicts in a one-to-one correspondence with the multiple applications of the multi-application computing environment. In one embodiment, the SOD reference data table acts as a company's master SOD conflict matrix. Resolution matrix 142 specifies recommended actions to resolve SOD conflicts. Resolution matrix 142 associates each SOD conflict specified in table 138 with one or more recommended actions to resolve the SOD conflict. In one embodiment, each record of resolution matrix 142 includes an error code that identifies an SOD conflict, conflict text that describes the SOD conflict, recommendation text that describes a recommended action, and an action code that triggers an execution of code to perform the recommended action.

Organizational data table 132 includes data related to organizational parameters (e.g., organizational levels and locations). For example, the data in table 132 allows an ad hoc analysis of SOD conflicts to be limited to SOD conflicts within a single level of an organization (e.g., within a single department or a single line of business). Application reference data table 134 includes data related to software applications, which allows an ad hoc analysis of SOD conflicts to be limited to SOD conflicts that include at least one authorization related to a specified application.

The data stored in data storage 104 is described in more detail below relative to the section entitled Setup Steps and relative to FIGS. 2, 3, 4, 5A-5B, and 6.

Setup Steps

Prior to the processes described below (see FIGS. 2-4, 5A-5B and 6), one or more administrators using computing units (e.g., computing unit 110 of FIG. 1) pre-define authorization reference data (i.e., authorizations). The administrator(s) use their computing units to send the pre-defined authorization reference data to server computing system 102 (see FIG. 1), which then stores the authorization reference data in authorization reference data table 130 (see FIG. 1) for each software application of a multi-application computing environment. In one embodiment, authorization reference data table 130 (see FIG. 1) associates each authorization with a corresponding application of the multi-application computing environment. The authorization reference data includes attributes that specify what a particular authorization allows a user to do in a particular application. For example, authorization reference data may specify that in Application A, Authority XYZ (i.e., attribute 1) allows a user to "Update Production Data" (i.e., attribute 2), and the relevant production data is Labor Data (i.e., attribute 3).

In response to each authorization being pre-defined, a unique person identifier is specified for that authorization. Thus, the pre-defined authorizations are associated with unique person identifiers in a one-to-one correspondence. The individual identified by a unique person identifier owns the pre-defined authorization that corresponds to the unique person identifier. The unique person identifiers are commonly accessed across the multiple applications of the multi-application environment. The server computing system 102 (see FIG. 1) stores the unique person identifiers in user data table 136 (see FIG. 1).

Prior to the processes described below (see FIGS. 2-4, 5A-5B and 6), and for each application of the multi-application computing environment, the one or more administrators use their computing units (e.g., computing unit 110 of FIG. 1) to pre-define SOD conflicts. The pre-defined SOD conflicts (e.g., collected in a template format) identify tasks (i.e., actions) that, if performed by an individual, cause a violation of SOD policy. The identified tasks that cause an SOD conflict may be performed in a single application or each task of the identified tasks may be performed in a corresponding application of multiple applications. A person may be granted an authorization to perform each of the identified tasks. The computing units of the one or more administrators send the pre-defined SOD conflicts to server computing system 102 (see FIG. 1), which then stores the pre-defined SOD conflicts in SOD reference data table 138 (see FIG. 1). SOD reference data table 138 (see FIG. 1) associates an authorization to perform each task of a pre-defined SOD conflict with a corresponding application of the multi-application computing environment. The pre-defined SOD conflicts in the SOD reference data table may act as a business entity's master SOD conflict matrix that specifies SOD conflicts across multiple applications.

Prior to the processes described below (see FIGS. 2-4, 5A-5B and 6), and for each application of the multi-application computing environment, the one or more administrators use their computing units (e.g., computing unit 110 of FIG. 1) to pre-define recommended actions (i.e., resolutions) that resolve the SOD conflicts stored in SOD reference data table 138 (see FIG. 1). Thus, each SOD conflict in table 138 (see FIG. 1) is associated with one or more pre-defined recommended actions. The computing units used by the administrator(s) send the pre-defined recommended actions to server computing system 102 (see FIG. 1), which then stores the pre-defined recommended actions in resolution matrix 142 (see FIG. 1).

Process for Identifying and Resolving SOD Conflicts

Figure 2:
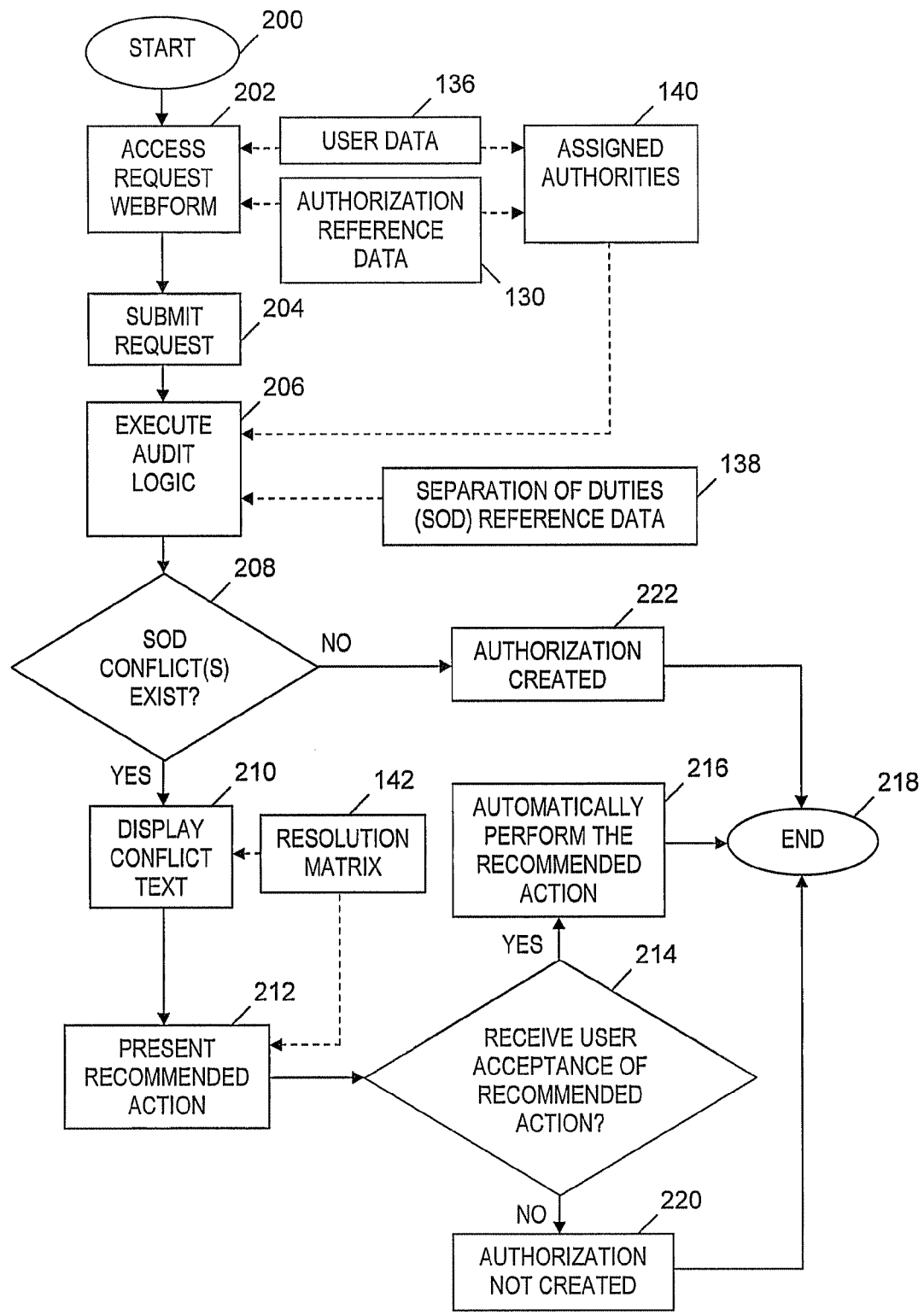
FIG. 2 is a flowchart of an authorization request process implemented in the system of FIG. 1, in accordance with embodiments of the present invention.

FIG. 2 is a flowchart of an authorization request process implemented in the system of FIG. 1, in accordance with embodiments of the present invention. The authorization request process begins at step 200. In step 202, an end user utilizes computing unit 106 (see FIG. 1) to view a webform for submitting an access request (i.e., a request for a new authorization) in a multi-application computing environment. The webform is provided by entitlement function 122 (see FIG. 1). The end user enters a new authorization and an identification of a person (e.g., employee) in the webform. The person identified in the request is a person for whom the new authorization is being requested. In step 204, the request is submitted to server computing system 102 (see FIG. 1).

In step 206, audit logic processing code 128 (see FIG. 1) (a.k.a. audit logic) is executed. The audit logic retrieves assigned authorities from assigned authorities table 140 (see FIG. 1), which specifies all authorizations that are owned by the person identified in the webform (see step 202) and that are associated with a particular application. For each authorization owned by the identified person, the audit logic compares the new authorization's attributes (i.e., what the authorization allows the person to do) and the data related thereto (e.g., the Labor Data in the example presented above) to the SOD reference data stored in SOD reference data table 138 (see FIG. 1) to determine if there is an SOD conflict.

The comparison between the new authorization's attributes and to the SOD reference data is performed across multiple applications in the multi-application computing environment. That is, a new authorization that is associated with a first application is compared in step 206 to SOD reference data associated with the first application and with SOD reference data associated with one or more other applications.

If audit logic processing code 128 (see FIG. 1) determines the existence of one or more SOD conflicts in step 208 (i.e., identifies one or more SOD conflicts), then audit logic processing code 128 (see FIG. 1) retrieves text (i.e., conflict text) from resolution matrix 142 (see FIG. 1), where the conflict text describes the identified SOD conflict(s). After the conflict text is retrieved, step 210 includes the audit logic processing code 128 (see FIG. 1) initiating a display of the conflict text on a display device. For example, server computing system 102 (see FIG. 1) sends the conflict text to a computing unit (e.g., computing unit 106 of FIG. 1) and the computing unit then displays the conflict text on a display device coupled to the computing unit.

As one example, the identified SOD conflict is described by Authorization 1 being in conflict with Authorization 2, where Authorization 1 is associated with Application A, while Authorization 2 is associated with Application B, which is different from Application A. As another example, the identified SOD conflict is described by Authorization 1 being in conflict with Authorization 2, where both Authorization 1 and Authorization 2 are associated with Application A.

The audit logic processing code 128 (see FIG. 1) also retrieves recommendation text from resolution matrix 142 (see FIG. 1) in response to identifying one or more SOD conflicts in step 208. The retrieved recommendation text describes one or more recommended actions for resolving each SOD conflict identified in step 208. In step 212, server computing system 102 (see FIG. 1) initiates a presentation of the recommendation text (a.k.a. the presented recommended action(s)) (e.g., initiates a display of the one or more recommended actions on a display device). In one embodiment, in step 212, server computing system 102 (see FIG. 1) sends the recommendation text to a computing unit (e.g., computing unit 106 of FIG. 1) and the computing unit then displays the one or more recommended actions on a display device coupled to the computing unit.

In one embodiment, audit logic processing code 128 (see FIG. 1) retrieves a single recommended action for each of the identified SOD conflicts in step 212, where each single recommended action is a pre-defined optimal action for resolving one of the identified SOD conflicts.

In one embodiment, in step 210, audit logic processing code 128 (see FIG. 1) initiates a display of the recommended action(s) on a display device coupled to a computing unit (e.g., computing unit 106 of FIG. 1).

If the end user accepts one or more of the presented recommended action(s) in step 214, then server computing system 102 (see FIG. 1) receives the user's acceptance of one or more of the presented recommended action(s) (a.k.a. the accepted recommended action(s)) and the Yes branch of step 214 is followed; otherwise, the server computing system receives the user's rejection of the presented recommended action(s) and the No branch of step 214 is followed. In step 216, which follows the Yes branch of step 214, server computing system 102 (see FIG. 1) automatically performs the accepted recommended action(s) (e.g., to remove an authorization from the assigned authorities table 140 so that the authorization is no longer owned by the person identified in the request), thereby resolving an identified SOD conflict. Step 216 also includes server computing system 102 (see FIG. 1) creating the requested authorization by storing in assigned authorities table 140 an association between the requested authorization and the person identified in the request. Following step 216, the authorization request process ends at step 218.

In one embodiment, audit logic processing code 128 (see FIG. 1) presents multiple alternative recommended actions (or multiple alternative sets of recommended actions) in step 212 along with rankings of the recommended actions (or sets of recommended actions), where the rankings are determined according to pre-defined criteria stored in a database residing in a computer data storage device coupled to server computing system 102 (see FIG. 1). The user may accept an optimal recommended action (or an optimal set of recommended actions) in step 214 by selecting the highest ranked recommended action (or highest ranked set of recommended actions).

In one embodiment, in step 212, audit logic processing code 128 (see FIG. 1) initiates a display of one or more recommended actions on a display device as a selectable list of one or more authorizations (or one or more sets of authorizations), where each listed authorization (or set of authorizations) needs to be removed to resolve an SOD conflict identified in step 208. The listed authorization(s) (or set(s) of authorizations) are authorization(s) previously assigned to the person identified on the request submitted in step 204. In the embodiment described in this paragraph, the end user accepts a recommended action in step 214 by using a graphical user interface to select an authorization (or set of authorizations) from the selectable list displayed in step 212. Audit logic processing code 128 (see FIG. 1) then removes the selected authorization (or selected set of authorizations) from assigned authorities table 140 (see FIG. 1) so that the selected authorization (or selected set of authorizations) is no longer associated with the person identified in the request, thereby resolving an identified SOD conflict.

Returning to step 214, if the server computing system 102 (see FIG. 1) does not receive from the end user an acceptance of any of the presented recommended action(s), then in step 220 the requested authorization is not created (i.e., not stored in assigned authorities table 140 of FIG. 1 so as to be associated with the person identified in the request) and the process ends at step 218.

Returning to step 208, if audit logic processing code 128 (see FIG. 1) determines that no SOD conflicts exist, then the requested authorization is created in step 222 by including in assigned authorities table 140 an association between the requested authorization and the person identified in the request. Following step 222, the authorization request process ends at step 218.

Revalidation Process

Figure 3:
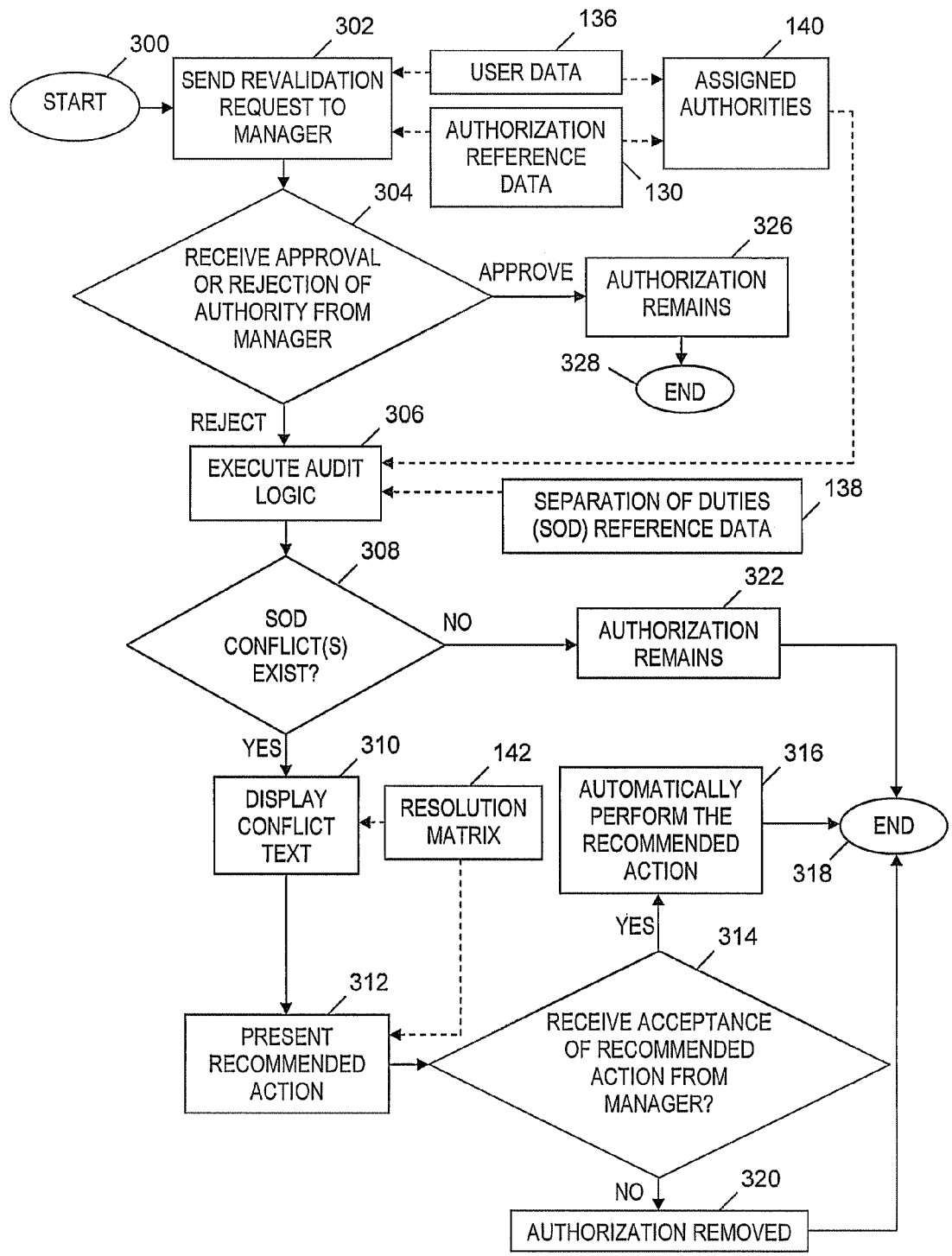
FIG. 3 is a flowchart of a cross-application authorization revalidation process implemented in the system of FIG. 1, in accordance with embodiments of the present invention.

FIG. 3 is a flowchart of a cross-application authorization revalidation process implemented in the system of FIG. 1, in accordance with embodiments of the present invention. The cross-application authorization revalidation process of FIG. 3 is used, for example, by a manager who is required by regulations or business standards to periodically review existing authorizations to determine if the authorizations are currently valid. The authorization revalidation process begins at step 300. In step 302, server computing system 102 (see FIG. 1) or another computing system sends a revalidation request to a computing unit (e.g., computing unit 108 of FIG. 1) utilized by a manager or another end user. The revalidation request is a request to revalidate an authorization (a.k.a. the authorization being revalidated) owned by a person identified in the revalidation request. For example, the manager receives a revalidation request in an email with a link to a revalidation webform. The revalidation webform is provided by revalidation function 126 (see FIG. 1). In step 304, the manager either approves or rejects the authorization included in the revalidation request. Also in step 304, server computing system 102 (see FIG. 1) receives the manager's approval or rejection of the authorization included in the revalidation request.

If the server computing system 102 (see FIG. 1) receives the manager's rejection of the authorization in step 304, then in step 306, audit logic processing code 128 (see FIG. 1) (a.k.a. audit logic) is executed. From assigned authorities table 140, the audit logic retrieves authorizations owned by the person identified in the request. The audit logic determines whether the authorization being revalidated together with any of the retrieved authorizations identify an SOD conflict that is specified in SOD reference data table 138. The authorization being revalidated and a retrieved authorization that identify an SOD conflict may be specified in different applications or in the same application.

In step 308, audit logic processing code 128 (see FIG. 1) determines whether or not there exist any SOD conflicts related to the authorization being revalidated. The examples of identified SOD conflicts presented above relative to FIG. 2 also apply to an SOD conflict identified in step 308.

In one embodiment, audit logic processing code 128 (see FIG. 1) identifies SOD conflicts in step 308 across the multiple applications of the multi-application computing environment. That is, audit logic processing code 128 (see FIG. 1) identifies at least one SOD conflict in step 308 that specifies a conflict between a first authorization and a second authorization, where the first authorization is associated with a first application, the second authorization is associated with a second application, and the first and second applications are different applications.

If audit logic processing code 128 (see FIG. 1) determines that one or more SOD conflicts exist (i.e., identifies one or more SOD conflicts) in step 308, then audit logic processing code 128 (see FIG. 1) retrieves text (i.e., conflict text) from resolution matrix 142. The retrieved conflict text describes the SOD conflict(s) identified in step 308. Subsequent to the retrieval of the conflict text, the server computing system 102

(see FIG. 1) initiates a display of the conflict text on a display device in step 310. In one embodiment, in step 310, the server computing system 102 (see FIG. 1) sends the conflict text to a computing unit (e.g., computing unit 108 of FIG. 1) and the computing unit then displays the conflict text on a display device coupled to the computing unit. In one embodiment, server computing system 102 also displays the conflict text.

In one embodiment, in step 310, audit logic processing code 128 (see FIG. 1) initiates a display of the conflict text on a display device coupled to a computing unit (e.g., computing unit 108 of FIG. 1).

The audit logic processing code 128 (see FIG. 1) also retrieves recommendation text from resolution matrix 142 in response to identifying one or more SOD conflicts in step 308. The recommendation text describes one or more recommended actions for resolving each SOD conflict identified in step 308. After the retrieval of the recommendation text, server computing system 102 (see FIG. 1) initiates a display of the recommendation text (a.k.a. the presented recommended action(s)) in step 312. In one embodiment, in step 312, the server computing system sends the recommendation text to a computing unit (e.g., computing unit 112 of FIG. 1) and the computing unit presents (i.e., displays) the recommendation text on a display device coupled to the computing unit.

In one embodiment, audit logic processing code 128 (see FIG. 1) presents a single recommended action in step 312 for each of the identified SOD conflicts, where each single recommended action is a pre-defined optimal action for resolving one of the identified SOD conflicts.

In one embodiment, audit logic processing code 128 (see FIG. 1) initiates a display of the recommendation text on a display device coupled to a computing unit (e.g., computing unit 112 of FIG. 1).

If the manager accepts one or more of the presented recommended action(s) in step 314, then the server computing system 102 (see FIG. 1) receives the manager's acceptance of one or more of the presented recommended action(s) (a.k.a. the accepted recommended action(s)) and the Yes branch of step 314 is followed; otherwise, the server computing system receives the manager's rejection of the presented recommended action(s) and the No branch of step 314 is followed. In step 316, which follows the Yes branch of step 314, server computing system 102 (see FIG. 1) automatically performs the accepted recommended action(s) (e.g., to remove an authorization from assigned authorities 140 so that the authorization is no longer associated with the person identified in the request), thereby resolving an identified SOD conflict. The authorization request process ends at step 318.

In one embodiment, audit logic processing code 128 (see FIG. 1) presents multiple alternative recommended actions (or multiple alternative sets of recommended actions) in step 312 along with rankings of the recommended actions (or sets of recommended actions), where the rankings are determined according to pre-defined criteria stored in a database residing in a computer data storage device coupled to server computing system 102 (see FIG. 1). The manager may accept an optimal recommended action (or an optimal set of recommended actions) in step 314 by selecting the highest ranked recommended action (or highest ranked set of recommended actions).

In one embodiment, audit logic processing code 128 (see FIG. 1) initiates a display of one or more recommended actions on a display device in step 312 as a selectable list of one or more authorizations (or one or more sets of authorizations), where each listed authorization (or set of authorizations) needs to be removed to resolve an SOD conflict identified in step 308. The listed authorization(s) (or set(s) of authorizations) are authorization(s) previously assigned to the person identified in the request (i.e., the person whose authorization is being revalidated). In the embodiment described in this paragraph, the manager accepts a recommended action in step 314 by using a graphical user interface to select an authorization (or set of authorizations) from the selectable list displayed in step 312. Audit logic processing code 128 (see FIG. 1) then removes the selected authorization (or selected set of authorizations) from assigned authorities table 140 so that the selected authorization (or selected set of authorizations) is no longer associated with the person identified in the request, thereby resolving an SOD conflict identified in step 308.

Returning to step 314, if the server computing system 102 (see FIG. 1) does not receive from the manager an acceptance of any of the presented recommended action(s), then in step 320 the manager performs another action to remove one or more authorizations from assigned authorities table 140, thereby resolving an SOD conflict identified in step 308. As one example, if the identified SOD conflict is caused by a first authorization and a second authorization, and the recommended action is to delete the first authorization from assigned authorities table 140, the manager may instead delete the second authorization from assigned authorities table 140 in step 320 to resolve the identified SOD (or the manager may remove both the first authorization and the second authorization from the assigned authorities table). Following step 320, the revalidation request process ends at step 318.

Returning to step 308, if audit logic processing code 128 (see FIG. 1) determines that no SOD conflicts exist, then in step 322 the authorization being revalidated remains in data storage 104 (see FIG. 1) (e.g., remains in assigned authorities table 140) and the revalidation request process then ends at step 318.

Returning to step 304, if the server computing system 102 (see FIG. 1) receives the manager's approval of the authorization being revalidated, then in step 326 the authorization remains in data storage 104 (see FIG. 1) (e.g., remains in assigned authorities table 140) and the revalidation request process ends at step 328.

Ad Hoc SOD Conflicts Analysis

Figure 4:
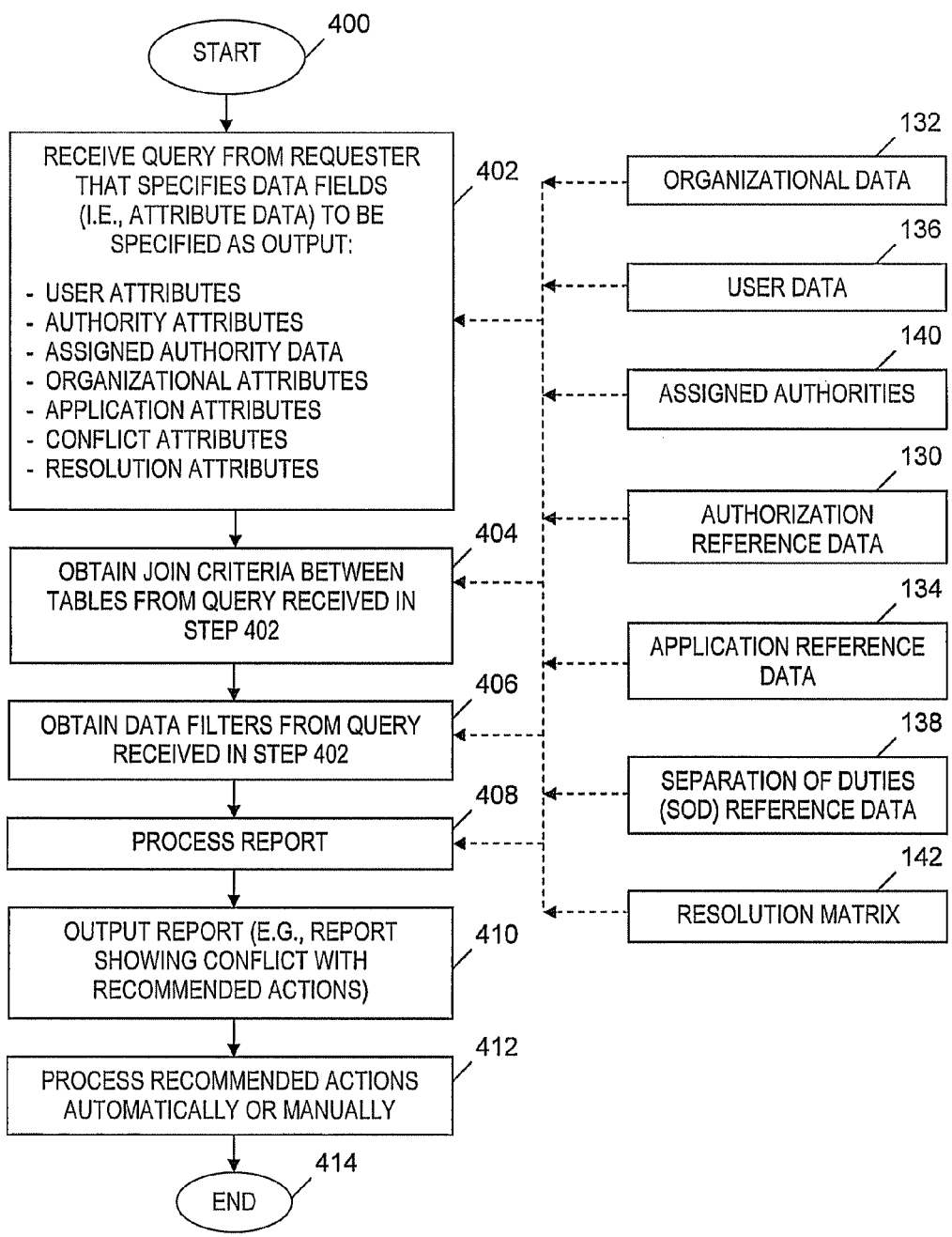
FIG. 4 is a flowchart of an ad hoc separation of duties conflicts analysis process implemented in the system of FIG. 1, in accordance with embodiments of the present invention.

FIG. 4 is a flowchart of an ad hoc separation of duties conflicts analysis process implemented in the system of FIG. 1, in accordance with embodiments of the present invention. The ad hoc analysis starts at step 400. In step 402, a requester specifies data fields to be specified as output. The requester specifies the data fields in step 402 by writing a query using report writing function 118 (see FIG. 1). The specified data fields include attribute data, such as user attributes (e.g., user identifiers) stored in user data table 136, attributes of authorizations (i.e., authority attributes) stored in authorization reference data table 130, assigned authority data (i.e., authorizations assigned to particular users) stored in assigned authorities table 140, organizational attributes stored in organizational data table 132, application attributes stored in application reference data table 134, SOD conflict attributes stored in SOD reference data 138, and resolution attributes stored in resolution matrix 142. Also in step 402, server computing system 102 (see FIG. 1) receives the query that specifies the aforementioned data fields.

In the aforementioned query, the requester specifies join criteria between tables to analyze authorizations against the aggregate SOD matrix (i.e., SOD reference data table 138) to identify SOD conflicts across multiple applications of the multi-application computing environment. The requester specifies the join criteria in step 404 via the aforementioned query that uses report writing function 118 (see FIG. 1). For example, the requester specifies join criteria between assigned authorities table 140 and SOD reference data table 138. In one embodiment, the requester specifying data fields in step 402 is a manager using a webform to analyze authorizations against the aggregate SOD matrix. In step 404, the server computing system 102 (see FIG. 1) obtains the requester-specified join criteria between tables from the query received in step 402.

In the aforementioned query, the requester specifies one or more data filters to limit the authorizations being analyzed to a set of authorizations that satisfies conditions specified in the data filter(s). The requester specifies the data filter(s) in step 406 via the aforementioned query that uses report writing function 118 (see FIG. 1). In one embodiment, a filter specified in step 406 limits the authorizations by a selected department or other organizational unit of a business entity. For example, a manager specifies a filter in step 406 that limits the analyzed authorizations to only those authorizations owned by employees of the manager's department. In step 406, the server computing system 102 (see FIG. 1) obtains the requester-specified data filter(s) from the query received in step 402.

In step 408, report writing function 118 (see FIG. 1) processes the query used in steps 402, 404 and 406 to cross reference authorizations associated with specified users and included in assigned authorities table 140 against the aggregate SOD matrix to identify SOD conflicts and recommended actions to resolve the identified SOD conflicts. Also in step 408, report writing function 118 (see FIG. 1) processes the query used in steps 402, 404 and 406 to generate a report that includes the identified SOD conflicts and recommended actions to resolve the SOD conflicts. In step 410, report output function 120 (see FIG. 1) outputs the generated report for display on a display device coupled to a computing unit (e.g., computing unit 110 of FIG. 1).

In step 412, the recommended actions are processed either manually or automatically to resolve the identified SOD conflicts. In one embodiment, each recommended action is associated with a graphical user interface (GUI) element (e.g., a button) on the report. If the manager approves a recommended action, the manager activates the GUI element associated with the recommended action, and the recommended action is automatically performed by server computing system 102 (see FIG. 1) in step 412, thereby resolving an SOD conflict. For example, by activating a GUI element associated with a recommended action, audit logic processing code 128 (see FIG. 1) reads an action code in resolution matrix 142 that is associated with an identified SOD conflict, thereby triggering a deletion of an authorization to resolve the identified SOD conflict (i.e., a deletion of the authorization from assigned authorities table 140).

If the manager rejects the recommended action, then the manager must resolve the SOD conflict by manually performing in step 412 the recommended action or one or more other actions as an alternative to the recommended action. Following step 412, the ad hoc analysis ends at step 414.

System-Wide SOD Conflicts Analysis

Figure 5A:
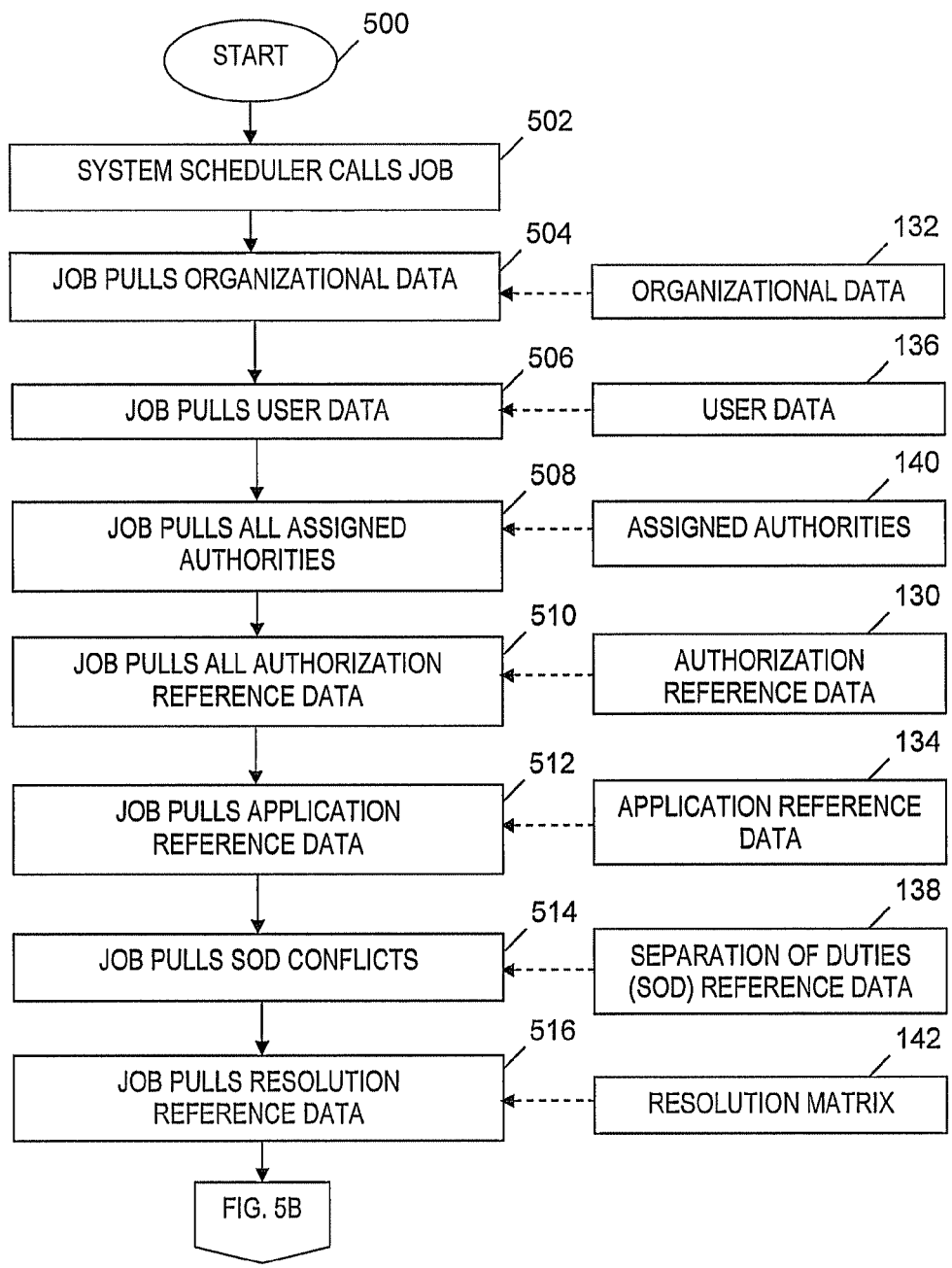
FIGS. 5A-5B depict a flowchart of a manual implementation of a system-wide separation of duties conflicts analysis process, where the process is implemented in the system of FIG. 1, in accordance with embodiments of the present invention.
Figure 5B:
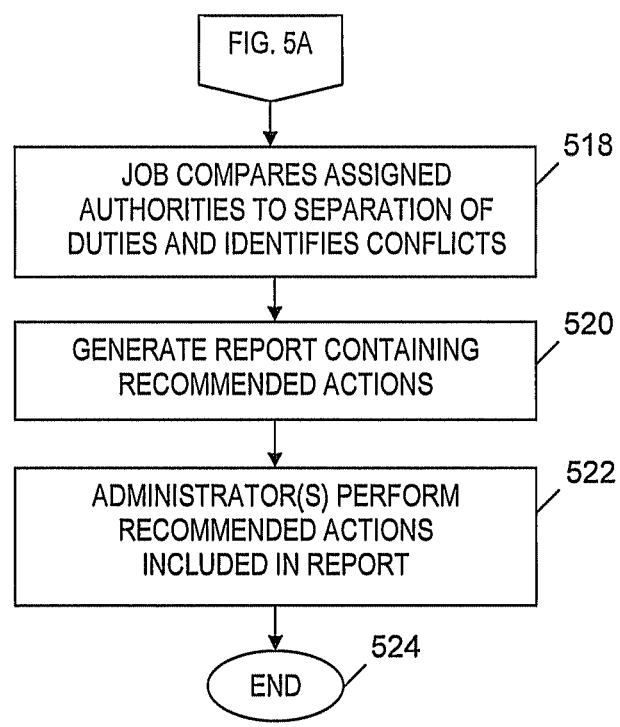

FIGS. 5A-5B depict a flowchart of a manual implementation of a system-wide separation of duties conflicts analysis process using a scheduled job, where the process is implemented in the system of FIG. 1, in accordance with embodiments of the present invention. The manual system-wide SOD conflicts analysis is periodically executed using a scheduled job and begins at step 500 in FIG. 5A. In step 502, job scheduler 116 (see FIG. 1) calls the scheduled job for performing a periodic system-wide analysis of SOD conflicts. Relative to the discussion of FIGS. 5A-5B, the scheduled job called in step 502 is also referred to simply as "the job." As used herein, "system-wide analysis" refers to an SOD conflict analysis applied to multiple software applications of a system.

In step 504, the job pulls organizational data from organizational data table 132. In step 506, the job pulls user data from user data table 136. In step 508, the job pulls all assigned authorities from assigned authorities table 140. In step 510, the job pulls all authorization reference data from authorization reference data table 130. In step 512, the job pulls application reference data from application reference data table 134. In step 514, the job pulls SOD conflicts from SOD reference data table 138. In step 516, the job pulls resolution reference data (i.e., recommended actions) from resolution matrix 142 (see FIG. 1).

Step 518 of FIG. 5B follows step 516. In step 518, system-wide comparison code 124 (see FIG. 1) compares the assigned authorities pulled in step 508 to the pulled SOD conflicts (see step 514). Based on the comparison in step 518, system-wide comparison code 124 (see FIG. 1) identifies one or more SOD conflicts caused by the assigned authorities pulled in step 508. System-wide comparison code 124 (see FIG. 1) also identifies set(s) of one or more recommended actions included in the resolution reference data pulled in step 516, where each set of one or more recommended actions resolves a corresponding SOD conflict included in the SOD conflict(s) identified in step 518.

In step 520, audit logic processing code 128 (see FIG. 1) initiates a display of a report that includes the set(s) of one or more recommended actions to resolve the SOD conflict(s) identified in step 518. The report of the set(s) of one or more recommended actions is displayed at a display device coupled to computing unit 110 (see FIG. 1) or to another computing unit. In step 522, administrator(s) manually activate GUI element(s) or manually enter responses on the report to perform the recommended action(s) included in the report. For example, an administrator may provide a Yes response to initiate a performance of a recommended action by server computing system 102 (see FIG. 1). The manual system-wide SOD conflicts analysis using a scheduled job ends at step 524.

Figure 6:
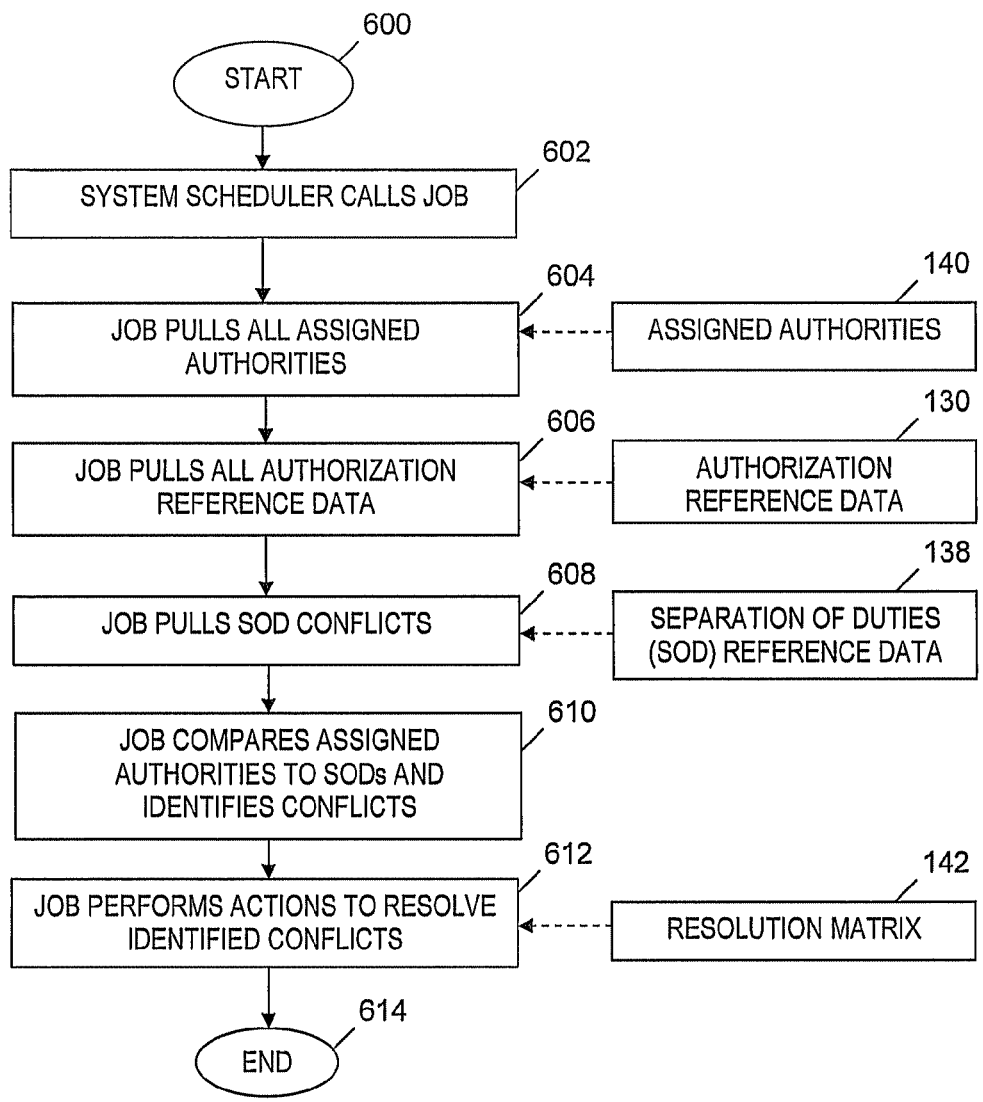
FIG. 6 is a flowchart of an automatic implementation of a system-wide separation of duties conflicts analysis process, where the process is implemented in the system of FIG. 1, in accordance with embodiments of the present invention.

FIG. 6 is a flowchart of an automatic implementation of a system-wide separation of duties conflicts analysis process, where the process is implemented in the system of FIG. 1, in accordance with embodiments of the present invention. The automatic system-wide SOD conflicts analysis using a scheduled job begins at step 600. In step 602, job scheduler 116 (see FIG. 1) calls a scheduled job for performing a system-wide analysis of SOD conflicts. Relative to the discussion of FIG. 6, the scheduled job called in step 602 is also referred to simply as "the job."

In step 604, the job pulls all assigned authorities from assigned authorities table 140. In step 606, the job pulls all authorization reference data from authorization reference data table 130. In step 608, the job pulls SOD conflicts from SOD reference data table 138. In step 610, system-wide comparison code 124 (see FIG. 1) compares the assigned authorities pulled in step 604 to the SOD conflicts pulled in step 608. Based on the comparison in step 610, system-wide comparison code 124 (see FIG. 1) identifies one or more SOD conflicts caused by the assigned authorities pulled in step 604.

In step 612, system-wide comparison code 124 (see FIG. 1) identifies set(s) of one or more recommended actions included in resolution reference data pulled from resolution matrix 142. Each identified set of one or more recommended actions resolves a corresponding SOD conflict included in the one or more SOD conflicts identified in step 610. Also in step 612, the job automatically performs the identified set(s) of one or more recommended actions, thereby resolving the identified SOD conflict(s).

Example 1

In a first example, the following two authorizations are defined in authorization reference data table 130 (see FIG. 1):
  Authority 1 in labor claiming Application 1: "Ability to Claim Labor for Others", which indicates an ability to submit a labor expense charge for others.
  Authority 2 in labor approving Application 2: "Ability to Approve Labor", which indicates an ability to approve a labor expense charge.

In the SOD reference data table 138 (see FIG. 1), a conflict record identifies Authority 1 and Authority 2 as an SOD conflict. As part of this conflict record, an error code (i.e., ERR1) is stored. In user data table 136 (see FIG. 1), an employee data record includes the employee identifier "John Doe." The employee John Doe currently has one authorization (i.e., Authority 1) identified in assigned authorities table 140 (see FIG. 1).

In this first example, employee John Doe applies for Authority 2 using a request webform (see step 202 in FIG. 2). In response to John Doe submitting the request in step 204 (see FIG. 2), the audit logic processing code 128 (see FIG. 1) checks in step 208 (see FIG. 2) to determine if the newly requested authorization (i.e., Authority 2) conflicts with any of John Doe's current authorizations (i.e., Authority 1). The audit logic processing code cross references the current authorization (i.e., Authority 1) with the newly requested authorization (i.e., Authority 2) and determines that an SOD conflict exists between Authority 1 and Authority 2. The audit logic processing code returns the error code (i.e., ERR1) from the conflict record.

Based on the returned error code (i.e., ERR1), the audit logic processing code looks up text (i.e., conflict text) that describes an SOD conflict and one or more recommended actions that are associated with the error code in resolution matrix 142 (see FIG. 1). The conflict text and recommended action(s) resulting from the lookup are automatically returned to John Doe on the request webform screen. In this example, step 210 displays the following conflict text resulting from the resolution matrix lookup: "You cannot claim labor for others and approve labor." Further, step 212 displays the following recommendation text resulting from the resolution matrix lookup: "Reject current request and open a new labor approval authorization request for an administrator in your group that does not claim labor for others."

In response to receiving the recommended action on the request webform, the requester John Doe chooses to either accept the recommended action suggested by audit logic processing code 128 (see FIG. 1) (i.e., Yes branch of step 214 of FIG. 2) or simply close the request without creating the authorization (i.e., No branch of step 214 of FIG. 2).

In this example, John Doe accepts the recommended action (i.e., Yes branch of step 214 of FIG. 2). The audit logic processing code 128 (see FIG. 1) then reads an action code (i.e., ACT1) that is associated with the error code ERR1 in the resolution matrix 142 (see FIG. 1). The action code triggers code executed by server computing system 102 (see FIG. 1) that (1) closes out the current request, (2) looks up a person (a.k.a. a valid person) in John Doe's group (e.g., department or organization) who does not have Authority 1, and (3) automatically opens an access request webform to request that Authority 2 be granted to the valid person. The access request webform is then submitted and successfully processed, thereby granting Authority 2 to the valid person.

Example 2

In a second example, the following two authorizations are defined in authorization reference data table 130 (see FIG. 1):
  Authority 3 in account managing Application 3: "Ability to Manage an Account."
  Authority 1 in labor claiming Application 1: "Ability to Claim Labor for Others", which indicates an ability to submit a labor expense charge for others.

In the SOD reference data table 138 (see FIG. 1), a conflict record identifies Authority 3 and Authority 1 as an SOD conflict. As part of this conflict record, an error code (i.e., ERR2) is stored. In user data table 136 (see FIG. 1), an employee data record includes the employee identifier "Jane Smith." The employee Jane Smith currently has one authorization (i.e., Authority 1) identified in assigned authorities table 140 (see FIG. 1).

In this second example, employee Jane Smith applies for Authority 3 using a request webform (see step 202 in FIG. 2). In response to Jane Smith submitting the request in step 204 (see FIG. 2), the audit logic processing code 128 (see FIG. 1) checks in step 208 (see FIG. 2) to determine if the newly requested authorization (i.e., Authority 3) conflicts with any of Jane Smith's current authorizations (i.e., Authority 1). The audit logic processing code cross references the current authorization (i.e., Authority 1) with the newly requested authorization (i.e., Authority 3) and determines that an SOD conflict exists between Authority 1 and Authority 3. The audit logic processing code returns the error code (i.e., ERR2) from the conflict record.

Based on the returned error code (i.e., ERR2), the audit logic processing code looks up text (i.e., conflict text) that describes an SOD conflict and one or more recommended actions that are associated with the error code in resolution matrix 142 (see FIG. 1). The conflict text and recommended action(s) resulting from the lookup are automatically returned to Jane Smith on the access request webform screen. In this example, step 210 displays the following conflict text resulting from the resolution matrix lookup: "You cannot manage and claim labor for others for the same account." Further, step 212 displays the following recommendation text resulting from the resolution matrix lookup: "Delete authority to claim labor for others and process requested access for account management."

In response to receiving the recommended action on the access request webform, the requester Jane Smith chooses either to accept the recommended action suggested by audit logic processing code 128 (see FIG. 1) (i.e., Yes branch of step 214 of FIG. 2) or simply close the request without creating the authorization (i.e., No branch of step 214 of FIG. 2).

In this example, Jane Smith accepts the recommended action (i.e., Yes branch of step 214 of FIG. 2). The audit logic processing code 128 (see FIG. 1) then reads an action code (i.e., ACT2) that is associated with the error code ERR2 in the resolution matrix 142 (see FIG. 1). The action code triggers code executed by server computing system 102 (see FIG. 1) that (1) deletes Jane Smith's ownership of Authority 1, (2) processes the access request webform that includes the request to grant Authority 3 to Jane Smith, and (3) forwards the request on the access request webform to Jane Smith's manager for approval. In response to receiving the approval from Jane Smith's manager, Authority 3 is granted to Jane Smith.

Example 3

In a third example, the following two authorizations are defined in authorization reference data table 130 (see FIG. 1):

Authority 3 in account managing Application 3: "Ability to Manage an Account."

Authority 2 in labor approving Application 2: "Ability to Approve Labor", which indicates an ability to approve a labor expense charge.

In user data table 136 (see FIG. 1), an employee data record includes the employee identifier "Robert Jones" The employee Robert Jones currently has Authority 2 and Authority 3, which is specified in assigned authorities table 140 (see FIG. 1).

In this second example, after Robert Jones was granted Authority 2 and Authority 3, a change in business rules occurs that indicates that Authority 2 and Authority 3 are now in conflict. The business rules change is reflected in an update to SOD reference data table 138 (see FIG. 1). The update to the SOD reference data table is a new conflict record that indicates an SOD conflict between Authority 2 and Authority 3. The new conflict record stores an error code (i.e., ERR3).

As a result of the business rules change, a revalidation effort is initiated. Robert Jones' manager receives a revalidation request in step 302 (see FIG. 3) in an email that includes a hyperlink to a revalidation webform. The manager activates the hyperlink and the resulting revalidation webform presents employee data related to Robert Jones, as well as Authority 2 and Authority 3. The audit logic processing code 128 (see FIG. 1) identifies an SOD conflict between Authority 2 and Authority 3 in step 308 (see FIG. 3) based on the new conflict record in SOD reference data table 138 (see FIG. 1). The revalidation webform flags both Authority 2 and Authority 3 as being in conflict per the new conflict record.

The revalidation webform also includes a recommendation button that the manager may activate to display one or more recommended actions that can be selected to resolve the identified SOD conflict. The manager activates (i.e., clicks on) the recommendation button and in response, the audit logic processing code 128 (see FIG. 1) retrieves the error code (i.e., ERR3) from the new conflict record and looks up conflict text in resolution matrix 142 (see FIG. 1) based on the error code. The conflict text describes the identified SOD conflict. In this example, step 310 (see FIG. 3) looks up and displays the following conflict text resulting from the resolution matrix lookup: "You cannot manage and approve labor for the same account." The conflict text is displayed to the manager on the revalidation webform.

The resolution matrix lookup also looks up recommendation text associated with the error code (i.e., ERR3), where the recommendation text describes one or more recommended actions to resolve the identified SOD conflict. In this example, the following recommendation text results from the resolution matrix lookup and is automatically displayed to the manager on the revalidation webform in step 312 (see FIG. 3): "Delete authority to approve labor and keep authority for account management."

In response to receiving the recommended action on the revalidation webform, the manager chooses either to accept the recommended action suggested by audit logic processing code 128 (see FIG. 1) (i.e., Yes branch of step 314 of FIG. 3) or simply close the request (i.e., No branch of step 314 of FIG. 3).

In this example, the manager accepts the recommended action (i.e., Yes branch of step 314 of FIG. 3). The audit logic processing code 128 (see FIG. 1) then reads an action code (i.e., ACT3) that is associated with the error code ERR3 in the resolution matrix 142 (see FIG. 1). The action code triggers code executed by server computing system 102 (see FIG. 1) that (1) deletes Robert Jones' ownership of Authority 2 and (2) closes out the revalidation webform.

If the displayed recommended action was not accepted in step 314 (see FIG. 3), then the manager must resolve the identified SOD conflict without being facilitated by the audit logic processing code (e.g., by deleting Robert Jones' ownership of Authority 3 or by deleting Robert Jones' ownership of Authority 2 and Authority 3).

Computing System

Figure 7:
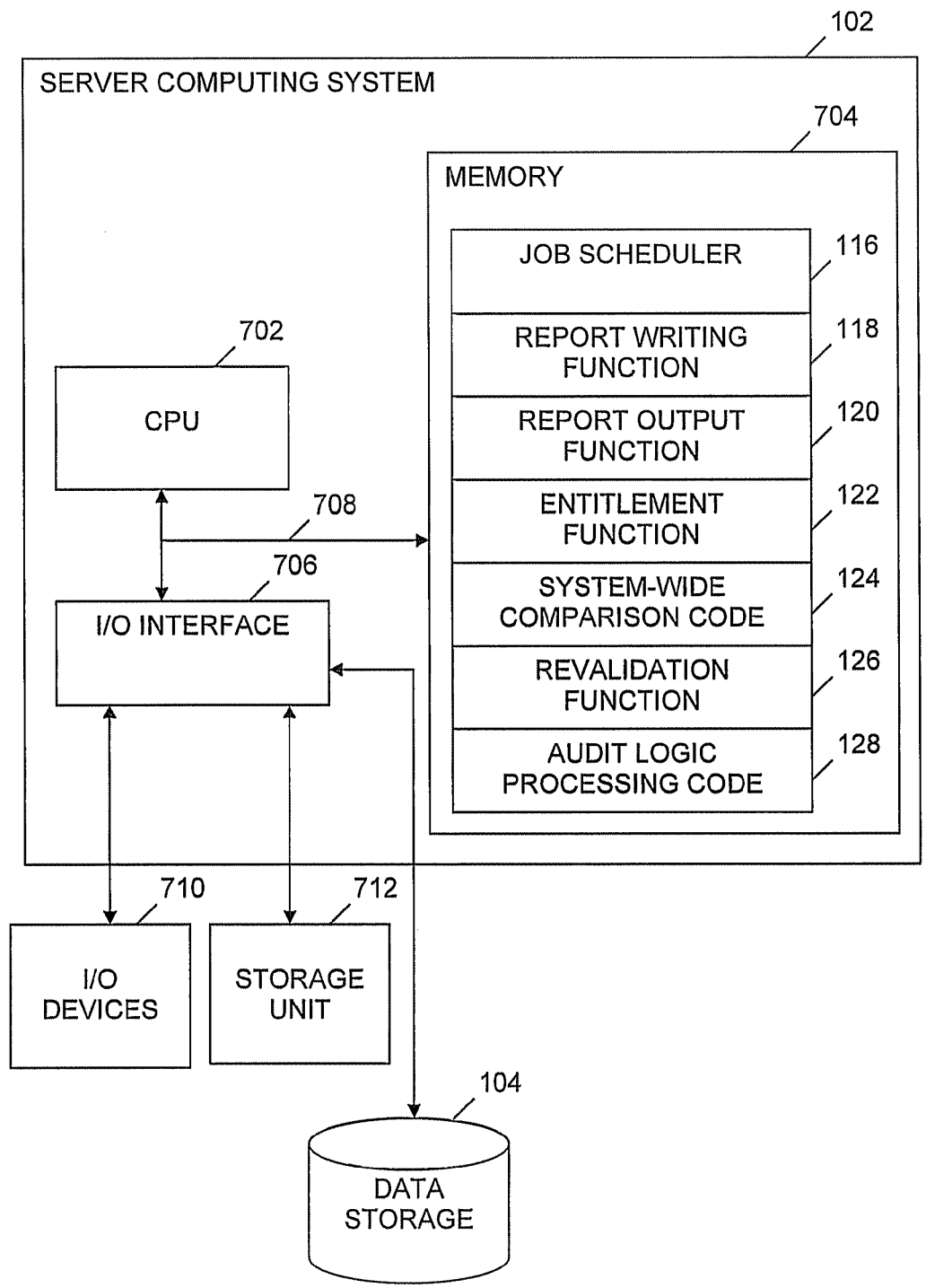
FIG. 7 is a block diagram of a computing system that is included in the system of FIG. 1 and that implements one or more of the processes of FIGS. 2, 3, 4, 5A-5B and 6, in accordance with embodiments of the present invention.

FIG. 7 is a block diagram of a computing system that is included in the system of FIG. 1 and that implements one or more of the processes of FIGS. 2, 3, 4, 5A-5B and 6, in accordance with embodiments of the present invention.

Server computing system 102 generally comprises a central processing unit (CPU) 702, a memory 704, an input/output (I/O) interface 706, and a bus 708. Further, computing system 102 is coupled to I/O devices 710 and a computer data storage unit 712. CPU 702 performs computation and control functions of computing system 102. CPU 702 may comprise a single processing unit, or be distributed across one or more processing units in one or more locations (e.g., on a client and server).

Memory 704 may comprise any known type of computer data storage and/or transmission media, including bulk storage, magnetic media, optical media, random access memory (RAM), read-only memory (ROM), a data cache, a data object, etc. In one embodiment, cache memory elements of memory 704 provide temporary storage of at least some program code in order to reduce the number of times code must be retrieved from bulk storage during execution. Moreover, similar to CPU 702, memory 704 may reside at a single physical location, comprising one or more types of data storage, or be distributed across a plurality of physical systems in various forms. Further, memory 704 can include data distributed across, for example, a local area network (LAN) or a wide area network (WAN).

I/O interface 706 comprises any system for exchanging information to or from an external source. I/O devices 710 comprise any known type of external device, including a display device (e.g., monitor), keyboard, mouse, printer, speakers, handheld device, facsimile, etc. Bus 708 provides a communication link between each of the components in computing system 102, and may comprise any type of transmission link, including electrical, optical, wireless, etc.

I/O interface 706 also allows computing system 102 to store and retrieve information (e.g., program instructions or data) from an auxiliary storage device such as computer data storage unit 712. Computer data storage unit 712 may be a non-volatile storage device, such as a magnetic disk drive (i.e., hard disk drive) or an optical disc drive (e.g., a CD-ROM drive which receives a CD-ROM disk). Computing system 102 accesses the data tables in data storage 104 via I/O interface 706. The data tables in data storage 104 may reside in computer data storage unit 712 or in one or more other computer data storage units (not shown).

Memory 704 may include computer program code for one or more of the following functions: job scheduler 116, report writing function 118, report output function 120, entitlement function 122 and revalidation function 126. Memory 704 also may include computer program code that includes system-wide comparison code 124 and/or audit logic processing code 128. Audit logic processing code 128 and/or system-wide comparison code 124 provides the logic for identifying and resolving separation of duties conflicts in a multi-application computing environment (e.g., the process of FIG. 2). Further, memory 704 may include other systems not shown in FIG. 7, such as an operating system (e.g., Linux) that runs on CPU 702 and provides control of various components within and/or connected to computing system 102.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "system" (e.g., system 100 or computing system 102). Furthermore, the present invention may take the form of a computer program product embodied in any tangible medium of expression (e.g., memory 704 or computer data storage unit 712) having computer-usable program code (e.g., audit logic processing code 128) embodied in the medium.

Any combination of one or more computer-usable or computer-readable medium(s) (e.g., memory 704 and computer data storage unit 712) may be utilized. The computer-usable or computer-readable medium may be, for example but not limited to, an electronic, magnetic, optical, electromagnetic, infrared or semiconductor system, apparatus, or device. A non-exhaustive list of more specific examples of the computer-readable medium includes: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, or a magnetic storage device. Note that the computer-usable or computer-readable medium could even be paper or another suitable medium upon which the computer program (e.g., code 128) is printed, as the computer program can be electronically captured via, for instance, optical scanning of the paper or other medium, then compiled, interpreted, or otherwise processed in a suitable manner, if necessary, and then stored in a computer memory 704. In the context of this document, a computer-usable or computer-readable medium may be any medium that can store the program for use by or in connection with the instruction execution system, apparatus, or device. The computer-usable program code may be transmitted using any appropriate medium, including but not limited to wireless, wireline, optical fiber cable, RF, etc.

Computer program code (e.g., code 128) for carrying out operations of the present invention may be written in any combination of one or more programming languages, including an object oriented programming language such as Java®, Smalltalk, C++ or the like and conventional procedural programming languages, such as the "C" programming language or similar programming languages. The program code may execute entirely on a user's computer (e.g., computing system 102), partly on the user's computer, as a stand-alone software package, partly on the user's computer and partly on a remote computer or entirely on the remote computer or server. In the latter scenario, the remote computer may be connected to the user's computer through any type of network (not shown), including a LAN, a WAN, or the connection may be made to an external computer (e.g., through the Internet using an Internet Service Provider).

The present invention is described herein with reference to flowchart illustrations (e.g., FIGS. 2, 3, 4, 5A-5B and 6) and/or block diagrams of methods, apparatus (systems) (e.g., FIG. 1 and FIG. 7), and computer program products according to embodiments of the invention. It will be understood that each block of the flowchart illustrations and/or block diagrams, and combinations of blocks in the flowchart illustrations and/or block diagrams, can be implemented by computer program instructions (e.g., code 128). These computer program instructions may be provided to a processor (e.g., CPU 702) of a general purpose computer (e.g., computing system 102), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium (e.g., memory 704 or computer data storage unit 712) that can direct a computer or other programmable data processing apparatus to function in a particular manner, such that the instructions stored in the computer-readable medium produce an article of manufacture including instruction means which implement the function/act specified in the flowchart and/or block diagram block or blocks.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

The computer program instructions may also be loaded onto a computer (e.g., computing system 102) or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Any of the components of the present invention can be deployed, managed, serviced, etc. by a service provider that offers to deploy or integrate computing infrastructure with respect to the method of identifying and resolving separation of duties conflicts in a multi-application computing environment. Thus, the present invention discloses a process for supporting computer infrastructure, comprising integrating, hosting, maintaining and deploying computer-readable code (e.g., code 128) into a computing system (e.g., computing system 102), wherein the code in combination with the computing system is capable of performing a method of identifying and resolving separation of duties conflicts in a multi-application computing environment.

In another embodiment, the invention provides a business method that performs the process steps of the invention on a subscription, advertising and/or fee basis. That is, a service provider, such as a Solution Integrator, can offer to create, maintain, support, etc. a method of identifying and resolving separation of duties conflicts in a multi-application computing environment. In this case, the service provider can create, maintain, support, etc. a computer infrastructure that performs the process steps of the invention for one or more customers. In return, the service provider can receive payment from the customer(s) under a subscription and/or fee agreement, and/or the service provider can receive payment from the sale of advertising content to one or more third parties.

The flowcharts in FIGS. 2, 3, 4, 5A-5B and 6, and the block diagrams in FIG. 1 and FIG. 7 illustrate the architecture, functionality, and operation of possible implementations of systems, methods, and computer program products according to various embodiments of the present invention. In this regard, each block in the flowchart or block diagrams may represent a module, segment, or portion of code (e.g., code 128), which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A computer-implemented method of identifying and resolving a separation of duties (SOD) conflict, the method comprising the steps of:
   based on predefined rules specifying combinations of permissions causing SOD conflicts, a computing system identifying the SOD conflict for a person granted (a) a first permission to perform a first action provided by a first application, and (b) a second permission to perform a second action provided by a second application, the first application having a different function than the second application;
   in response to the computing system identifying the SOD conflict and based on predefined correlations in a database between the SOD conflicts and recommended actions, the computing system correlating the SOD conflict with a recommended action to resolve the SOD conflict, the recommended action to delete the first permission for the person or delete the second permission for the person, and initiating display of the recommended action on a display device; and
   subsequent to the computing system initiating display of the recommended action, the computing system receiving an acceptance of one of the recommended actions from a user, and in response, the computing system deleting the first or second permission for the person according to the accepted recommended action,
   wherein the database includes another permission that allows the person to perform another action provided by the first application, the second application or another application, and the one recommended action does not include deleting the other permission.

2. The method of claim 1, further comprising the steps of:
   prior to the step of identifying the SOD conflict, the computing system assigning the first permission and the second permission to the person;
   subsequent to the step of assigning the first and second permissions and prior to the step of identifying the SOD conflict, the computing system storing in the database a first association between the first permission and the person and a second association between the second permission and the person;
   subsequent to the step of storing the first association and the second association, the computing system receiving a change to the predefined rules, the change causing the combinations of permissions to include a combination of the first permission and the second permission causing the SOD conflict;
   based on the change to the predefined rules, the computing system receiving a request to revalidate the permissions, including the first permission and the second permission; and
   subsequent to the step of receiving the request to revalidate, the computing system revalidating the permissions by performing the steps of:
      the computing system identifying the SOD conflict;
      the computing system correlating the SOD conflict with the recommended action;
      the computing system initiating display of the recommended action;
      the computing system receiving the acceptance of the one recommended action; and
      the computing system deleting the first permission for the person according to the one recommended action by deleting the first association in the database.

3. The method of claim 1, further comprising the steps of:
   prior to the step of identifying the SOD conflict, the computing system assigning the first permission and the second permission to the person;
   subsequent to the step of assigning the first and second permissions and prior to the step of identifying the SOD conflict, the computing system storing in the database a first association between the first permission and the person and a second association between the second permission and the person;
   subsequent to the step of storing the first association and the second association, the computing system receiving a change to the predefined rules, the change causing the combinations of permissions to include a combination of the first permission and the second permission causing the SOD conflict;
   based on the change to the predefined rules, the computing system receiving a request to revalidate the permissions, including the first permission and the second permission; and
   subsequent to the step of receiving the request to revalidate, the computing system revalidating the permissions by performing the steps of:
      the computing system identifying the SOD conflict;
      the computing system correlating the SOD conflict with the recommended action;
      the computing system initiating display of the recommended action;
      the computing system receiving the acceptance of the one recommended action; and
      the computing system deleting the second permission for the person according to the one recommended action by deleting the second association in the database.

4. The method of claim 1, further comprising the steps of:
   in response to the step of identifying the SOD conflict, the computing system determining a plurality of recommended actions that includes the recommended action, each recommended action, when performed, resolving the SOD conflict;
   in response to the step of determining the plurality of recommended actions and based on predefined criteria, the computing system determining a plurality of rankings of the plurality of recommended actions;
   the computing system selecting a preferred recommended action from the plurality of recommended actions based on the plurality of rankings;

the computing system presenting the plurality of recommended actions by presenting the preferred recommended action as a highest ranked recommended action of the plurality of recommended actions based on the plurality of rankings; and the computing system receiving a selection from the user of the recommended action as the preferred recommended action or another recommended action of the plurality of recommended actions.

5. The method of claim 1, further comprising:

based on the predefined correlations in the database between the SOD conflicts and the recommended actions, the computing system determining a first action to delete in the database an association between the first permission and the person to resolve the SOD conflict, and determining a second action to delete in the database an association between the second permission and the person to resolve the SOD conflict;

the computing system initiating display of the first and second actions on the display device; and the computing system receiving a selection by the user of the first action or the second action from among the displayed first and second actions to indicate the first action is the one recommended action if the selection is of the first action or to indicate the second action is the one recommended action if the selection is of the second action, wherein the step of deleting the first or second permission for the person according to the one recommended action includes deleting the first permission for the person by performing the first action to delete in the database the association between the first permission and the person to resolve the SOD conflict if the selection is of the first action, and wherein the step of deleting the first or second permission for the person according to the one recommended action includes deleting the second permission for the person by performing the second action to delete in the database the association between the second permission and the person to resolve the SOD conflict if the selection is of the second action.

6. The method of claim 1, further comprising the steps of:

the computing system determining the first permission allows the person to approve a charge for a labor expense for work done on a first project;

the computing system determining the second permission allows the person to submit a charge for a labor expense for work done by other persons on a second project;

the computing system determining the first and second projects are the same project, wherein the step of identifying the SOD conflict is based on the first permission allowing the person to approve the charge for the labor expense for work done on the first project, based on the second permission allowing the person to submit the charge for the labor expense for work done by other persons on the second project, and based on the first and second projects being the same project;

the computing system determining a third permission allows the person to approve a charge for a labor expense for work done on a third project;

the computing system determining a fourth permission allows the person to submit a charge for a labor expense for work done by other persons on a fourth project;

the computing system determining the third and fourth projects are different projects; and the computing system determining no SOD conflict arises from the third and fourth permissions, based on the third permission allowing the person to approve the charge for the labor expense for work done on the third project, based on the fourth permission allowing the person to submit the charge for the labor expense for work done by other persons on the fourth project, and based on the third and fourth projects being different projects.

7. The method of claim 1, further comprising:

the computing system receiving a request for granting to a second person a third permission to perform a third action provided by a third application;

based on the predefined rules specifying the combinations of permissions causing the SOD conflicts, the computing system identifying a second SOD conflict for the second person granted a fourth permission to perform a fourth action provided by a fourth application;

in response to the computing system identifying the second SOD conflict and based on the predefined correlations in the database between the SOD conflicts and the recommended actions, the computing system correlating the second SOD conflict with a second recommended action to resolve the second SOD conflict, the second recommended action to reject the request for granting the third permission, and initiating display of the second recommended action on the display device; and subsequent to the computing system initiating display of the second recommended action, the computing system receiving a second acceptance of the second recommended action from a second user, and in response, the computing system rejecting the request for granting the third permission and retaining the fourth permission allowing the second person to perform the fourth action according to the accepted second recommended action.

8. A computer system for identifying and resolving a separation of duties (SOD) conflicts, the computer system comprising:

a CPU;

a computer-readable memory;

a computer-readable, tangible storage device;

based on predefined rules specifying combinations of permissions causing SOD conflicts, first program instructions to identify the SOD conflict for a person granted (a) a first permission to perform a first action provided by a first application, and (b) a second permission to perform a second action provided by a second application, the first application having a different function than the second application;

in response to identifying the SOD conflict by the first program instructions and based on predefined correlations in a database between the SOD conflicts and recommended actions, second program instructions to correlate the SOD conflict with a recommended action to resolve the SOD conflict, the recommended action to delete the first permission for the person or delete the second permission for the person, third program instructions to initiate display of the recommended action on a display device; and subsequent to initiating display of the recommended action by the third program instructions, fourth program instructions to receive an acceptance of one of the recommended actions from a user, and in response, fifth program instructions to delete the first or second permission for the person according to the accepted recommended action, wherein the database includes another permission that allows the person to perform another action provided by the first application, the second application or another application, and the one recommended action does not include deleting the other permission, wherein the first, second, third, fourth and fifth program instructions are stored on the computer-readable, tangible storage device for execution by the CPU via the computer-readable memory.

9. The system of claim 8, further comprising:

prior to identifying the SOD conflict by the first program instructions, sixth program instructions to assign the first permission and the second permission to the person;

subsequent to assigning the first and second permissions by the sixth program instructions and prior to identifying the SOD conflict by the first program instructions, seventh program instructions to store in the database a first association between the first permission and the person and a second association between the second permission and the person;

subsequent to storing the first association and the second association by the seventh program instructions, eighth program instructions to receive a change to the predefined rules, the change causing the combinations of permissions to include a combination of the first permission and the second permission causing the SOD conflict;

based on the change to the predefined rules, ninth program instructions to receive a request to revalidate the permissions, including the first permission and the second permission; and subsequent to receiving the request to revalidate by the ninth program instructions, tenth program instructions to revalidate the permissions by:
    identifying the SOD conflict by the first program instructions;
    correlating the SOD conflict with the recommended action by the second program instructions;
    initiating display of the recommended action by the third program instructions;
    receiving the acceptance of the one recommended action by the fourth program instructions; and
    by the fifth program instructions, deleting the first permission for the person according to the one recommended action by deleting the first association in the database, wherein the sixth, seventh, eighth, ninth and tenth program instructions are stored on the computer-readable, tangible storage device for execution by the CPU via the computer-readable memory.

10. The system of claim 8, further comprising:

prior to identifying the SOD conflict by the first program instructions, sixth program instructions to assign the first permission and the second permission to the person;

subsequent to assigning the first and second permissions by the sixth program instructions and prior to identifying the SOD conflict by the first program instructions, seventh program instructions to store in the database a first association between the first permission and the person and a second association between the second permission and the person;

subsequent to storing the first association and the second association by the seventh program instructions, eighth program instructions to receive a change to the predefined rules, the change causing the combinations of permissions to include a combination of the first permission and the second permission causing the SOD conflict;

based on the change to the predefined rules, ninth program instructions to receive a request to revalidate the permissions, including the first permission and the second permission; and subsequent to receiving the request to revalidate by the ninth program instructions, tenth program instructions to revalidate the permissions by:
    identifying the SOD conflict by the first program instructions;
    correlating the SOD conflict with the recommended action by the second program instructions;
    initiating display of the recommended action by the third program instructions;
    receiving the acceptance of the one recommended action by the fourth program instructions; and
    by the fifth program instructions, deleting the second permission for the person according to the one recommended action by deleting the second association in the database, wherein the sixth, seventh, eighth, ninth and tenth program instructions are stored on the computer-readable, tangible storage device for execution by the CPU via the computer-readable memory.

11. The system of claim 8, further comprising:

based on the predefined correlations in the database between the SOD conflicts and the recommended actions, sixth program instructions to determine a first action to delete in the database an association between the first permission and the person to resolve the SOD conflict, and to determine a second action to delete in the database an association between the second permission and the person to resolve the SOD conflict;

seventh program instructions to initiate display of the first and second actions on the display device; and eighth program instructions to receive a selection by the user of the first action or the second action from among the displayed first and second actions to indicate the first action is the one recommended action if the selection is of the first action or to indicate the second action is the one recommended action if the selection is of the second action, wherein the sixth program instructions to delete the first or second permission for the person according to the one recommended action includes ninth program instructions to delete the first permission for the person by performing the first action to delete in the database the association between the first permission and the person to resolve the SOD conflict if the selection is of the first action, and wherein the sixth program instructions to delete the first or second permission for the person according to the one recommended action includes tenth program instructions to delete the second permission for the person by performing the second action to delete in the database the association between the second permission and the person to resolve the SOD conflict if the selection is of the second action, wherein the sixth, seventh, eighth, ninth and tenth program instructions are stored on the computer-readable, tangible storage device for execution by the CPU via the computer-readable memory.

12. The system of claim 8, further comprising:

sixth program instructions to determine the first permission allows the person to approve a charge for a labor expense for work done on a first project;

seventh program instructions to determine the second permission allows the person to submit a charge for a labor expense for work done by other persons on a second project;

eighth program instructions to determine the first and second projects are the same project, wherein identifying the SOD conflict by the first program instructions is based on the first permission allowing the person to approve the charge for the labor expense for work done on the first project, based on the second permission allowing the person to submit the charge for the labor expense for work done by other persons on the second project, and based on the first and second projects being the same project;

ninth program instructions to determine a third permission allows the person to approve a charge for a labor expense for work done on a third project;

tenth program instructions to determine a fourth permission allows the person to submit a charge for a labor expense for work done by other persons on a fourth project;

eleventh program instructions to determine the third and fourth projects are different projects; and twelfth program instructions to determine no SOD conflict arises from the third and fourth permissions, based on the third permission allowing the person to approve the charge for the labor expense for work done on the third project, based on the fourth permission allowing the person to submit the charge for the labor expense for work done by other persons on the fourth project, and based on the third and fourth projects being different projects, wherein the sixth, seventh, eighth, ninth, tenth, eleventh and twelfth program instructions are stored on the computer-readable, tangible storage device for execution by the CPU via the computer-readable memory.

13. The system of claim 8, further comprising:

sixth program instructions to receive a request for granting to a second person a third permission to perform a third action provided by a third application;

based on the predefined rules specifying the combinations of permissions causing the SOD conflicts, seventh program instructions to identify a second SOD conflict for the second person granted a fourth permission to perform a fourth action provided by a fourth application;

in response to identifying the second SOD conflict by the seventh program instructions, and based on the predefined correlations in the database between the SOD conflicts and the recommended actions, eighth program instructions to correlate the second SOD conflict with a second recommended action to resolve the second SOD conflict, the second recommended action to reject the request for granting the third permission, and to initiate display of the second recommended action on the display device; and subsequent to initiating display of the second recommended action by the eighth program instructions, ninth program instructions to receive a second acceptance of the second recommended action from a second user, and in response, reject the request for granting the third permission and retain the fourth permission allowing the second person to perform the fourth action according to the accepted second recommended action.

14. A computer program product for identifying and resolving a separation of duties (SOD) conflict, the computer program product comprising:

one or more computer-readable, tangible storage devices; and program instructions stored on the one or more computer-readable, tangible storage devices, the program instructions when executed by a CPU of a computer system:

based on predefined rules specifying combinations of permissions causing SOD conflicts, identify the SOD conflict for a person granted (a) a first permission to perform a first action provided by a first application, and (b) a second permission to perform a second action provided by a second application, the first application having a different function than the second application;

in response to identifying the SOD conflict by an execution of the program instructions and based on predefined correlations in a database between the SOD conflicts and recommended actions, correlate the SOD conflict with a recommended action to resolve the SOD conflict, the recommended action to delete the first permission for the person or delete the second permission for the person, and initiate display of the recommended action on a display device; and subsequent to initiating display of the recommended action by the execution of the program instructions, receive an acceptance of one of the recommended actions from a user, and in response, delete the first or second permission for the person according to the accepted recommended action, wherein the database includes another permission that allows the person to perform another action provided by the first application, the second application or another application, and the one recommended action does not include deleting the other permission.

15. The program product of claim 14, wherein the program instructions when executed by the CPU of the computer system:

prior to identifying the SOD conflict by the execution of the program instructions, assign the first permission and the second permission to the person;

subsequent to assigning the first authorization and the second authorization by the execution of the program instructions and prior to identifying the SOD conflict by the execution of the program instructions, store in the database a first association between the first permission and the person and a second association between the second permission and the person;

subsequent to storing the first association and the second association by the execution of the program instructions, receive a change to the predefined rules causing the combinations of permissions to include a combination of the first permission and the second permission;

based on the change to the predefined rules, receive a request to revalidate the permissions, including the first permission and the second permission; and subsequent to receiving the request to revalidate by the execution of the program instructions, revalidate the permissions by:

identifying the SOD conflict by the execution of the program instructions;

correlating the SOD conflict with the recommended action by the execution of the program instructions;

initiating display of the recommended action by the execution of the program instructions;

receiving the acceptance of the one recommended action by the execution of the program instructions; and by the execution of the program instructions, deleting the first permission for the person according to the one recommended action by deleting the first association in the database.

16. The program product of claim 14, wherein the program instructions when executed by the CPU of the computer system:

prior to identifying the SOD conflict by the execution of the program instructions, assign the first permission and the second permission to the person;

subsequent to assigning the first authorization and the second authorization by the execution of the program instructions and prior to identifying the SOD conflict by the execution of the program instructions, store in the database a first association between the first permission and the person and a second association between the second permission and the person;

subsequent to storing the first association and the second association by the execution of the program instructions, receive a change to the predefined rules causing the combinations of permissions to include a combination of the first permission and the second permission;

based on the change to the predefined rules, receive a request to revalidate the permissions, including the first permission and the second permission; and subsequent to receiving the request to revalidate by the execution of the program instructions, revalidate the permissions by:
- identify the SOD conflict by the execution of the program instructions;
- retrieve the optimal recommended action by the execution of the program instructions;
- initiate display of the optimal recommended action by the execution of the program instructions;
- receive the acceptance of the one optimal recommended action by the execution of the program instructions; and
- by the execution of the program instructions, deleting the second permission for the person according to the one recommended action by deleting the second association in the database.

17. The program product of claim 14, wherein the program instructions when executed by the CPU of the computer system:
based on the predefined correlations in the database between the SOD conflicts and the recommended actions, determine a first action to delete in the database an association between the first permission and the person to resolve the SOD conflict, and determine a second action to delete in the database an association between the second permission and the person to resolve the SOD conflict;
initiate display of the first and second actions on the display device; and
receive a selection by the user of the first action or the second action from among the displayed first and second actions to indicate the first action is the one recommended action if the selection if of the first action or to indicate the second action is the one recommended action if the selection is of the second action,
wherein deleting the first or second permission for the person according to the one recommended action by the execution of the program instructions includes deleting the first permission for the person by performing the first action to delete in the database the association between the first permission and the person to resolve the SOD conflict if the selection is of the first action, and
wherein deleting the first or second permission for the person according to the one recommended action by the execution of the program instructions includes deleting the second permission for the person by performing the second action to delete in the database the association between the second permission and the person to resolve the SOD conflict if the selection is of the second action.

18. The program product of claim 14, wherein the program instructions when executed by the CPU of the computer system:
determine the first permission allows the person to approve a charge for a labor expense for work done on a first project;
determine the second permission allows the person to submit a charge for a labor expense for work done by other persons on a second project;
determine the first and second projects are the same project,
wherein identifying the SOD conflict by the execution of the program instructions is based on the first permission allowing the person to approve the charge for the labor expense for work done on the first project, based on the second permission allowing the person to submit the charge for the labor expense for work done by other persons on the second project, and based on the first and second projects being the same project;
determine a third permission allows the person to approve a charge for a labor expense for work done on a third project;
determine a fourth permission allows the person to submit a charge for a labor expense for work done by other persons on a fourth project;
determine the third and fourth projects are different projects; and
determine no SOD conflict arises from the third and fourth permissions, based on the third permission allowing the person to approve the charge for the labor expense for work done on the third project, based on the fourth permission allowing the person to submit the charge for the labor expense for work done by other persons on the fourth project, and based on the third and fourth projects being different projects.

19. The program product of claim 14, wherein the program instructions when executed by the CPU of the computer system:
receive a request for granting to a second person a third permission to perform a third action provided by a third application;
based on the predefined rules specifying the combinations of permissions causing the SOD conflicts, identify a second SOD conflict for the second person granted a fourth permission to perform a fourth action provided by a fourth application;
in response to identifying the second SOD conflict by the execution of the program instructions and based on the predefined correlations in the database between the SOD conflicts and the recommended actions, correlate the second SOD conflict with a second recommended action to resolve the second SOD conflict, the second recommended action to reject the request for granting the third permission, and initiate display of the second recommended action on the display device; and
subsequent to initiating display of the second recommended action by the execution of the program instructions, receive a second acceptance of the second recommended action from a second user, and in response, reject the request for granting the third permission and retain the fourth permission allowing the second person to perform the fourth action according to the accepted second recommended action.

* * * * *